March 31, 1964  J. S. LAWRENCE, JR., ET AL  3,127,059
FLUID DELIVERY SYSTEM
Filed March 14, 1961  2 Sheets-Sheet 1
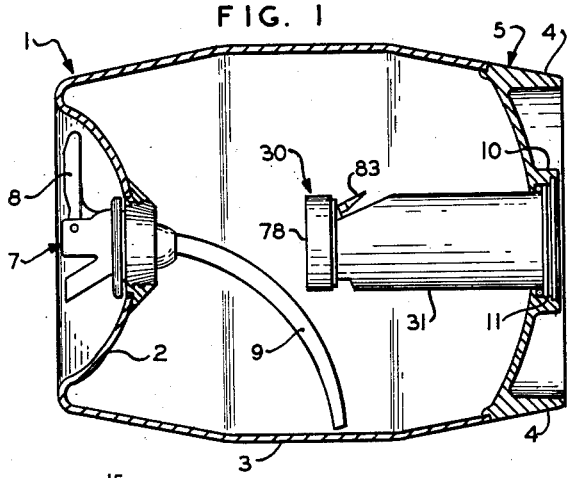
FIG. 1
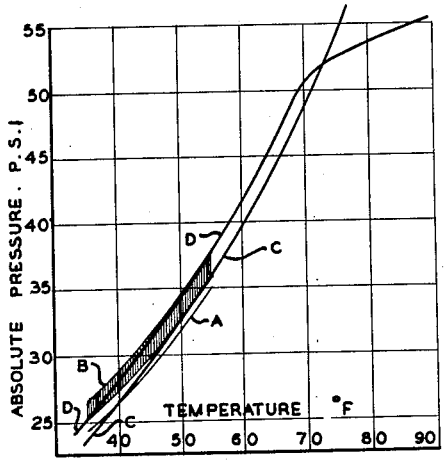
FIG. 4
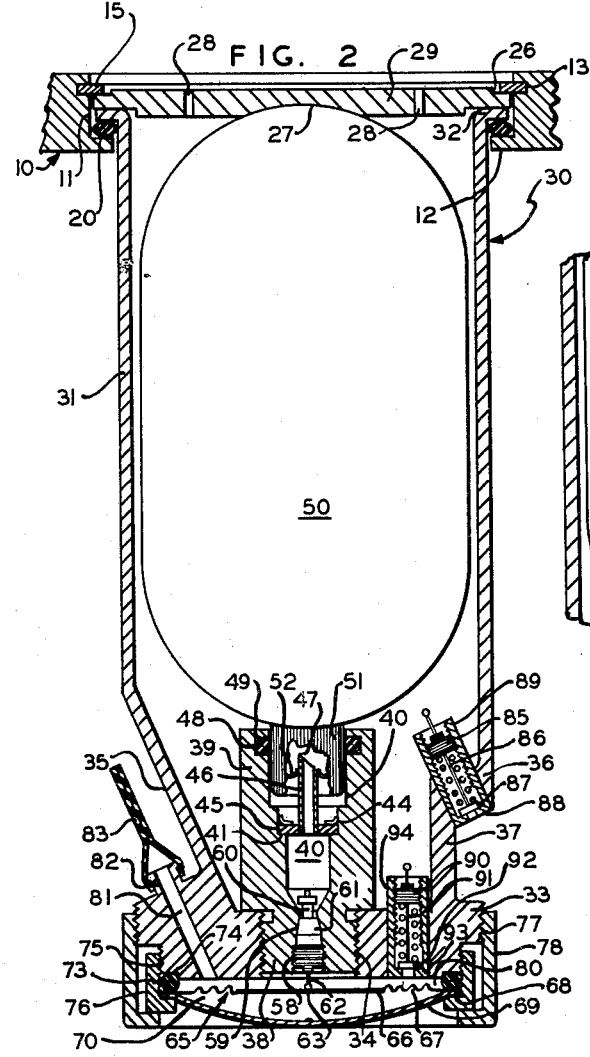
FIG. 2
FIG. 3
INVENTORS
JOSEPH S. LAWRENCE, JR.
HARRY T. HUTTON, JR.
BY
Milford F. Pietje
Agent

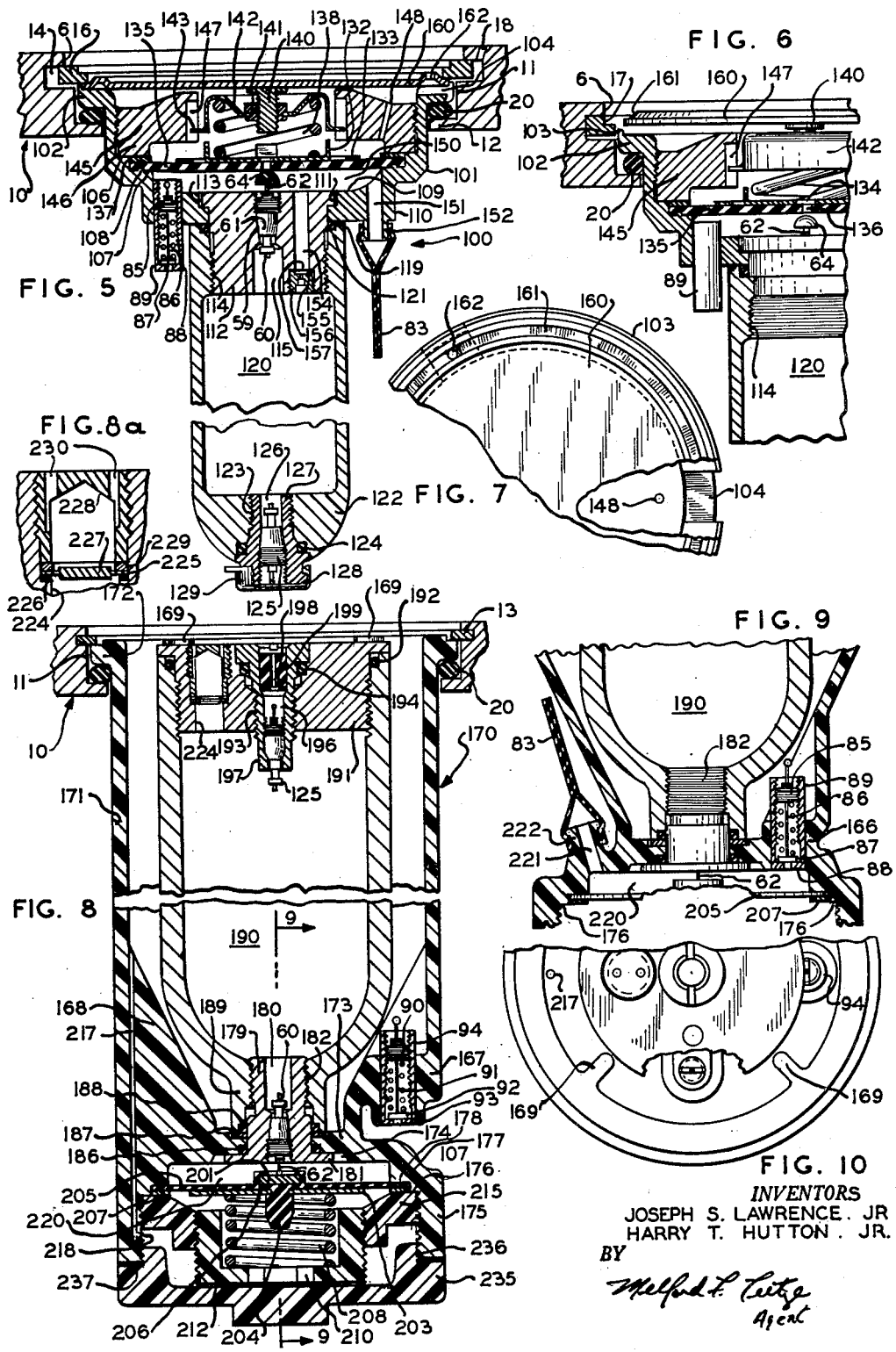

United States Patent Office 3,127,059
Patented Mar. 31, 1964

3,127,059
FLUID DELIVERY SYSTEM
Joseph S. Lawrence, Jr., Murray Hill, and Harry T. Hutton, Jr., Franklin Park, N.J., assignors to Air Reduction Company, Incorporated, New York, N.Y., a corporation of New York
Filed Mar. 14, 1961, Ser. No. 95,588
16 Claims. (Cl. 222—54)

This invention relates to liquid-pressurizing apparatus, and especially to apparatus which may be inserted into a keg or other container of the liquid, from which liquid-discharge means may be independently provided, for maintaining therewithin a suitable over-atmospheric pressure.

While not in all aspects limited thereto, the invention has especial utility in connection with beverages, such as beer, which normally contain or have dissolved therein, as a desired ingredient of the beverage in its ultimate form, carbon dioxide ($CO_2$). For use with such beverages the invention contemplates the maintenance, in the keg or other container, of a suitable pressure of carbon dioxide, thus not only pressurizing the beverage but also providing a source of supply from which the proper amount of carbon dioxide may be maintained in the beverage.

One of the purposes to which the invention is particularly directed is the pressurizing, for example with carbon dioxide, of beer or other beverage contained in a small keg, for example of the order of 18-pint capacity, which may be sold for storage in and dispensing of its contents from the home refrigerator—the keg being intended, when empty, to be returned to the bottling or filling establishment (e.g., brewery) for re-use. Such or similar purposes call for a pressurizing unit, for installation in the keg, which is compact and therefore not wasteful of the space within the keg; automatic in its action of maintaining suitable pressure; readily inserted and placed in operative state in the keg at the bottling or filling establishment; reasonably proof against removal or other tampering by the purchaser of the beverage; adequately safeguarded against the effects of accidental rupture or other failure of its various components; readily washable and sterilizable, without damage to any of its elements, in preparation for re-use; and, in its beverage-contacting surfaces, essentially inert with respect to the beverage.

It is an object of our invention to provide a compact pressurizing unit for such or similar purposes. It is an object to provide a unit which automatically maintains a suitable pressure in the keg or other container. It is an object to provide a unit which may be readily and efficiently inserted and placed in operative state in the keg or other container. It is an object to provide a unit which, when inserted in the keg, is reasonably proof against removal or other tampering by amateurs. It is an object to provide a unit which is adequately safeguarded against the effects of accidental rupture or other failure of its components. It is an object to provide a unit which may be readily and harmlessly washed and sterilized in preparation for re-use. It is an object to provide a unit whose beverage-contacting surfaces may be economically provided of materials essentially inert with respect to the beverage.

For any particular carbon-dioxide-containing beverage there is some ratio or approximate ratio of carbon dioxide which should be contained in dissolved state in the beverage in order that the beverage may be considered thoroughly palatable, i.e., not too carbonated and not too flat; for beer, for example, it is generally considered that approximately 2.5 standard volumes of carbon dioxide should be dissolved in each 1 volume of the beer.

It is an object of our invention to provide beverage-pressurizing apparatus of the type above described by which the ratio of the dissolved carbon dioxide to the beverage proper may be maintained at a desired value.

The overatmospheric, or gauge-read, pressure of carbon dioxide which must be maintained within the keg or other container, in order that there be maintained in the beverage a given ratio of volume of carbon dioxide to volume of the beverage proper, varies with the temperature of the beverage; for such a ratio of 2.5:1 with beer, for example, the required overatmospheric carbon-dioxide phessure will vary from approximately 8 p.s.i. at 32° F. to some 17.5 p.s.i. at 50° F. If the kegs or other containers of the beverage are sold to be stored for use (as in home refrigerators) at temperatures sufficiently near to a predetermined one, it may be considered sufficiently satisfactory to arrange the apparatus to maintain in the keg or container a carbon-dioxide pressure which will be effective at that predetermined temperature to maintain the desired ratio; if for example beer is the beverage and 2.5:1 the desired volume ratio and 40° F. the predetermined temperature which will always be approximately maintained during storage for use, it may be considered satisfactory to arrange the apparatus to maintain a 12 p.s.i. over-atmospheric carbon-dioxide pressure. If it be anticipated, however, that the temperatures of storage for use will vary significantly from a predetermined one, it becomes desirable to arrange the apparatus to maintain a carbon-dioxide pressure which will be an appropriate function of the temperature of that storage for use.

It is an object of our invention to provide beverage-pressurizing apparatus of the type above indicated by which the pressure of the carbon dioxide in the keg will be maintained at a value dependent on temperature in such a manner as to render substantially independent of temperature the ratio of the volume of the dissolved carbon dioxide to that of the beverage proper.

It is a general object to provide improved, simplified and inexpensive means for pressurizing the beverage or other liquid which is contained in a keg or other container.

Other and allied objects will appear from the following description and the appended claims.

In a typical form the invention contemplates a pressurizing unit adapted to be mounted in a keg at an aperture in the keg—through which aperture the keg may previously have been filled—the unit preferably consisting of a member which seals the aperture and to which the other elements of the unit are assembled. The unit typically comprises a pressure reservoir, a valve through which the pressure may be supplied from the reservoir to the space within the keg, and means responsive to the pressure within the keg for controlling that supply. The reservoir may be charged or chargeable with the pressurizing medium, typically carbon dioxide, and this may be carried out to a sufficiently high pressure so that that medium will be wholly or largely in a liquid state—this serving to conserve space and thus to facilitate compactness of the unit. In one type of embodiment the pressure reservoir will have been precharged before assembly of the unit to the filled keg, yet of course must not prematurely release its pressure, and the unit is arranged so that a single stroke on an appropriate part of the unit will both open a path from the unit to the space within the keg, and seal the unit to and thus close the aperture in the keg; in another type of embodiment the unit will be charged after its insertion in the filled keg. In the several embodiments there are preferably provided closure means which while the unit is being inserted require the application to an outer part of the unit of considerable force, and which resist removal in the absence of a similar (and to the home consumer, usually unavailable) force.

In its preferred embodiments the invention comprises a unit which has the effect of providing in the confines of the keg a reentrant portion within which the pressure reservoir may be mounted, thereby achieving the result of placing the reservoir within the general contour of the keg and yet outside of its functional interior—a feature of considerable value from the safety viewpoint, among other things because it precludes the effect of any accidental rupture of the pressure reservoir from placing the keg interior generally under excessive pressure. The invention also comprises the arrangement of the components in a manner facilitating the provision, as well as the provision itself, of suitable pressure-relief means.

In certain temperature-compensation aspects the invention comprises means efficiently integrated with the other components for modifying the response of the pressure-controlling valve, to the pressure in the space within the keg, in accordance with the temperature of that space. In a preferred way of embodying these temperature-compensation aspects the invention employs a chamber containing a loading expansible and contractible with temperature and itself expansible and contractible in response to the pressure developed by that loading—which in turn is preferably made a limited one, of a substance in liquid-vapor equilibrium at desired beverage temperatures and wholly in vapor state at temperatures which may be used in the process of sterilizing the unit preparatory to re-use.

In the description of the invention hereinafter set forth, reference is had to the accompanying drawing, in which FIGURE 1 is a vertical cross-sectional view taken longitudinally through a typical keg in which liquid is to be pressurized in accordance with the invention, this figure showing in elevation the unit of the next succeeding figures installed in the keg with its axis in the horizontal orientation appropriate to normal storage for use;

FIGURE 2 is a vertical cross-sectional view taken through the axis of a pressurizing unit according to our invention, such axis in this and succeeding figures being shown in the vertical orientation appropriate to the process of installation, and the portion of the keg to which the unit is immediately secured being fractionally shown;

FIGURE 3 is a fractional view of the unit of FIGURE 2 at a stage just prior to the final operation in the process of its installation in the keg;

FIGURE 4 is a set of curves showing certain pressure-temperature relationships pertinent to the operation of the unit of FIGURE 2;

FIGURE 5 is a view similar to FIGURE 2 but illustrating a modified unit according to the invention;

FIGURE 6 is a fractional view of the unit of FIGURE 5 at a stage just prior to the final operation in the process of its installation in the keg;

FIGURE 7 is a fractional plan view of the outer elements of the unit of FIGURE 5;

FIGURE 8 is a view similar to FIGURE 2 but illustrating a further modified unit according to the invention;

FIGURE 8a is an enlargement of a small portion of FIGURE 8;

FIGURE 9 is a fractional cross-sectional view taken along the line 9—9 of FIGURE 8; and FIGURE 10 is a partial plan view of the unit of FIGURE 8.

Reference being had to FIGURE 1, there will be seen a keg 1 typical of a container with which our invention may be employed to full advantage, resting on a flat side portion 3 as it ordinarily will be when stored (e.g., in a home refrigerator) in readiness for use. The keg may for example be formed (if desired, by drawing or rolling) from sheet metal, with a concave bottom 2 (seen at the left in FIGURE 1) continuous with its sides. Approximately centrally of the bottom 2 there may be installed in any convenient manner (not necessary herein to detail) a spigot 7, for example having the pivoted operating handle 8; the spigot will extend outwardly from the bottom 2 (preferably not quite to the plane of the bottom rim of the keg). Interiorly of the keg the spigot may communicate with a tube 9 which extends thereto from a region immediately inside the flat portion 3 on which the keg rests—and it will be understood that if the space within the keg be at substantially over-atmospheric pressure, opening of the spigot 7 will result in any liquid (other than the last trivial remnants) in the keg passing upwardly through the tube 9 to and outwardly through the spigot.

The top member 5 of the keg may for example be an element separately formed (if desired, by casting), permanently secured to and limitedly extending (at 4) the sides of the keg, and interiorly in the form of a dome; at approximately its center it may be provided with a relatively large-diameter boss (extending preferably not quite to the plane of the top rim of the keg) to form a substantially thickened central portion 10. It is through a relatively large-diameter aperture 11 in this central top portion 10 that the pressurizing unit is inserted into the keg, and to this central portion that that unit is secured.

A unit 30 according to our invention is illustrated in place in the keg in FIGURE 1, but may itself be better seen in the cross-sectional FIGURE 2. It is of the type, introductorily mentioned above, which has the effect of providing in the confines of the keg a reentrant portion. In this unit that reentrant portion is provided by a generally cylindrical shell 31, which at its outer extremity may be provided with the flange 32 extending away from its axis; this flange is sealed to the central cover portion 10 by pressure of the flange against a rubber O-ring 20, which is in turn pressed against a flange 12 formed at the inner end of the aperture 11 in cover portion 10. This pressure may be applied to the flange 32 through the rim of a cover disc 29 extending across the mouth and that flange of the shell 31, and therefore also serves to hold that cover disc in place. The pressure will initially have been applied to the cover disc by suitably powerful external means (not shown); it may be maintained by a member 15 which resists outward movement of the rim of the cover disc and thus of the shell flange and shell.

The member 15 may be a resilient C-ring, of normal diameter slightly greater than that of the aperture 11; this C-ring having been first collapsed in its own plane to a diameter slightly less than that of the aperture in order to introduce it into the latter, will then have been allowed to expand to its normal diameter in an annular slot 13 formed in the wall of the aperture 11 immediately outwardly of the position occupied by the rim of the cover disc 29 when the flange 32 is sealed in place.

Other than for an operating passage therethrough and certain excess-pressure relief means all hereinafter described, the shell 31 is closed at its inner extremity; on the other hand the cover disc 29 is provided with a plurality of apertures such as holes 28, its purpose being the restricted one of mechanically constraining the outer end of the pressure reservoir or capsule discussed below. It will therefore be understood that the space within the shell 31, although within the general contour of the keg, is in effect withdrawn from the space within the keg, and functionally rendered a space exterior to the keg and in substantially free communication with the ambient.

The closure of the inner end of the shell 31 may be accomplished by a disc portion 33 normal to the axis of the shell and of thickness substantially greater than that of the side wall of the shell; it is desirably, though not necessarily indispensably, integral with that side wall, and if the shell be of metal an impact-extrusion process may be a convenient one for the fabrication of it and the side wall as a single element. The central area of the disc portion 33 may be provided with a threaded hole 34 of substantial diameter, which in turn is closed by the screwing thereinto of the threaded base 38 of a generally cylindrical adapter 39 whose main portion is of larger diameter than the base 38 and extends from the disc portion 33 toward the mouth of the shell 31; the adapter 39 may be considered as functionally a part of the shell, being separately formed for convenience in fabrication. Axially through the adapter 39 there may be provided a passage 40, which thus passes through or traverses the confines of the shell; this passage 40 forms the avenue through which pressure will be introduced into the space within the keg, to pressurize the liquid therewithin.

Within the inner (lower-shown) part of the main body of the adapter 39 the passage 40 may have a limited-diameter portion outwardly terminating in an enlarging shoulder 41; inwardly against this shoulder a disc 45, for example of metal, may be held in any convenient manner—for example, by a dished annular retaining spring clip 44 peripherally "biting" into the wall of the passage. Centrally through and secured in and extending outwardly from this disc may be a small tube 46 preferably of hard metal; of this tube the outer end, which may still lie within the adapter 39, is ground at an angle to result in a sharp tube extremity 47. The passage 40 around and outwardly beyond the tube 46 is enlarged to receive the neck 51 of a pressure capsule 50, that neck being sealed to the adapter 39 as by a small rubber O-ring 49 inset into an annular groove 48 formed in the wall of the enlarged passage.

The pressure capsule 50, which forms the pressure reservoir and is disposed within and at least slightly spaced from the shell 31, will have been filled with a charge, typically of carbon dioxide, under high pressure; this charge will have been retained therein by a thin but strong diaphragm 52 sealed across and within the neck 51. In the operating condition of the unit 30, in which that unit is illustrated in FIGURE 2, that diaphragm 52 will have been carried to a position encircling the small tube 46, whose extremity 47 will therefore have punctured the diaphragm and placed the capsule 50 in communication, through the tube 46, with the passage 40. There will be described below the preferred process by which the capsule will have been brought into this position.

In the passage 40, near its inner extremity, there is interposed the valve 60 which is to regulate the transmission of pressure from the reservoir or capsule 50 to the space within the keg, and thus is to regulate the pressure in that space. The valve may be of the type commonly used for the retention of air pressure in (and its controllable release from) automobile tubes or tires, being here used for the retention of the charge in and its controllable release from the reservoir 50. To accommodate this form of valve the passage 40 may be formed with a frusto-conical seat 59 as a part of its wall at an appropriate distance outwardly from the inner extremity of the adapter 39, and with threading 58 between that extremity and that seat into which from that extremity the valve proper may be screwed. The valve proper may comprise a resilient frusto-conical surface 61; internal means (not shown) normally biasing the surface 61 to rest against the seat 59 (thus closing the valve); an axial stem 62 biased in the opposite direction (i.e., inwardly of the unit 30) but axially displaceable against its bias, and when so displaced serving through internal means (not shown) to move the surface 61 out of contact with the seat 59 (thus opening the valve); and a head 63 on which force may be exerted to displace the stem.

The valve 60 is made normally responsive to the pressure in the space within the keg. This is accomplished by providing in adjacency to the stem head 63 an element movable in a direction axial of the stem 62 and, within its range of movement, positionally responsive to that intra-keg pressure. Such an element is conveniently a diaphragm system comprising a diaphragm and means biasing it outwardly against the stem head 63 (thus tending to open the valve), the diaphragm however being movable inwardly against its bias (thus tending to close the valve) by the pressure in the space within the keg.

Such a diaphragm system is shown in FIGURE 2. It may for example comprise a circular thin metal diaphragm 65, typically of diameter somewhat smaller than the full diameter of the disc portion 33 of the shell, preferably centrally reinforced as indicated at 66, and if desired provided near its periphery with corrugations 67. As shown in FIGURE 2, the diaphragm 65 is secured around its periphery to the peripheral flange 68 of a shallow and rigid dome 69, for example of metal; this dome forms with the diaphragm a sealed chamber 70, of spherical-segment configuration. This chamber is mounted coaxially with the stem 62, with the diaphragm 65 adjacent the stem head and with the dome 69 on the opposite side of the diaphragm from that stem head, in a hereinafter-described manner which serves normally to expose the outer surface of the diaphragm to substantially the pressure in the general space within the keg—more specifically to that pressure plus a small fixed differential hereinafter explained. Means hereinafter described and disposed within the chamber 70 serve to bias the diaphragm outwardly toward the stem head 63.

It will be understood that the diaphragm 65 will assume a position wherein its outward bias is in equilibrium with the force exerted on its outer surface by the pressure in the general space within the keg, augmented by (a) the force developed on the diaphragm surface by the small fixed differential above-mentioned and hereinafter explained and, when the diaphragm is about to open or has already opened the valve 60, by (b) the force acting on the movable part of the valve 60 to hold it closed or to close it. The chamber 70 will be positioned so that when the proper pressure exists in the general space within the keg the diaphragm will be in contact with the stem head 63 and will be pressing thereagainst with a force infinitesimally less than required to move that stem head and thus to open the valve 60. Accordingly whenever the pressure in the general space within the keg drops to less than that proper pressure the diaphragm, seeking to restore the equilibrium mentioned above, will move upwardly and thus will open the valve—whereafter the progressive building up of pressure in that general space, resulting from the opening of the valve, will cause the diaphragm to move progressively downwardly until, when that proper pressure in that general space has been reestablished, the diaphragm will just have been restored to the initial position above described and the valve will just have been closed to stop the further build-up of pressure.

An appropriate mounting of the chamber 70 is accomplished by a holding of its periphery against a suitable abutment extending inwardly (i.e., downwardly in FIGURE 2) from the disc portion 33 of the shell 31. For purposes of facilitating axial adjustment of the chamber 70 relative to the stem head 63, this abutment may desirably be a yieldable one, and in FIGURE 2 it has been shown as formed by a suitably soft rubber O-ring 73. To receive a portion of the cross-section of this O-ring, the inner part of the disc portion 33—whose diameter will for example have been reduced to coincide with that of the O-ring—may be provided with a slight peripheral corner recess 74. From this recess outwardly that inner part of the disc portion 33 may be provided with external threading 75; onto this threading may be screwed the internally threaded and interiorly flanged ring 76, which embraces the periphery of chamber 70 and the O-ring 73, and which will cause that periphery to bear against that O-ring and to compress it to an extent—and thus will cause the chamber to move to an extent—dependent on the distance by which the ring 76 is screwed onto the threading 75. The outer (upper-shown) part of the shell disc portion 33 (which is of larger diameter than the chamber 70 and O-ring 73) may be provided with external threading 77; onto this threading may be screwed the internally threaded and interiorly flanged ring 78, which embraces the ring 76 and which, when screwed sufficiently so that its flange is tightened against that ring 76, will lock that ring in the position to which it has previously been adjusted.

It will be appreciated that in the structure as thus described the space 80 between the diaphragm 65 and the disc portion 33 of the shell will have been sealed off by the O-ring 73 from the remaining or general space within the keg, and that accordingly it will be that space 80 into which the valve 60 will discharge pressure from the pressure reservoir, and to the pressure within which the diaphragm 65 will be positionally responsive. These last two functions, however, are basically desired to be performed with respect to the general space within the keg; it is therefore necessary to undo, to an appropriate degree, the effects of that sealing-off. A complete such undoing may be accomplished by providing, through the disc portion 33, a duct 81 leading from the space 80 to the general space within the keg—the inner (lower-shown) side wall of the shell 31 being for example formed diagonally inwardly in the vicinity of that duct, as indicated at 35, for this purpose.

It is to be noted that for the function of discharging pressure from the reservoir into the general space within the keg there would be sufficient a one-way communication from the space 80 into that general space; further, that under normal circumstances the pressure-changing influences operating on the space within the keg will be confined to one—the drawing off of liquid from the keg through the spigot—which will of course be a pressure-reducing influence. A one-way communication from space 80 into the general space is therefore normally a sufficient one; it has the advantage that it prevents the liquid in the keg from coming into contact with the interior of the space 80 and with the valve 60—which if permitted entails the problem of insuring access of cleaning and sterilizing agents to the space 80, and risks possible unfavorable influences on the operation of the valve 60.

It is therefore both permissible and desirable to associate with the duct 81 a check valve which essentially freely permits communication from the space 80 to the general space within the keg, yet precludes communication in the opposite direction. When such a check valve is present the space 80 may be considered a pressure chamber, into which pressure will be discharged from the pressure reservoir, from which it will in turn be discharged into the general space within the keg, and in which the pressure will normally be substantially the same as the pressure within that general space—more specifically, will be the same plus a small fixed differential characteristic of the particular check valve which may be employed, this being the small fixed differential mentioned above.

While such a check valve may be provided in the structure of FIGURE 2 in any convenient form, there has been illustrated in that figure a cylindrical extension 82 of the duct 81 into the general space within the keg, and a length of normally collapsed rubber tubing 83 expanded at one end resiliently to encircle that extension. As is well understood with respect to such a check valve, an excess pressure directed against it from the pressure-chamber 80 side will relatively readily force open the normally still-collapsed part of the tubing, whereas an excess pressure directed against it from the other side will only augment the state of its collapse.

It will be appreciated that the structure of FIGURE 2 with the inwardly extending shell and pressure reservoir therewithin and with the space therebetween in substantially free communication with the ambient, inherently protects the keg proper against harmful effects of any rupture of the pressure reservoir. There are also, however, other possible accidental events (having to do for example with the valve 60) which may result in the building up within the keg of pressures (such for example as or approaching that originally within the reservoir) for which the keg may not and usually will not have been designed, and from which it is desirable to provide suitable excess-pressure relief means. In a construction in which a plane or near-plane member closes the keg aperture and a diaphragm (or equivalent) valve-control element for the then-internally-held reservoir is associated with that member, any excess-pressure relief means must generally compete with the diaphragm (or equivalent) for the space on that member—which is usually limited, so that the result of the competition is usually a compromising of diaphragm size or of effectiveness of the relief means or of both. The inwardly-extending-shell structure, providing between the periphery of the diaphragm (or equivalent) and the rim of the aperture a wealth of area exposed to the ambient, wholly avoids any such competition and the need for any such compromise.

In a thoroughly conservative approach to safety aspects it will be desired to provide independent excess-pressure relief means, each to the ambient, from the pressure chamber 80 and from the general space within the keg. In the structure of FIGURE 2 such two means are accommodated with great facility, and in any of a variety of positions. For ease of illustration in the single FIGURE 2, positions for such means have been chosen in the plane of that figure, on the opposite side of the axis from the duct 81.

Thus to accommodate an excess-pressure relief means leading from the general space within the keg to the ambient, the side wall of the shell 31, opposite the diagonal inward formation 35, may be provided with a local enlargement or bulge 36 toward the axis, the inner (lower-shown) extremity of which stops some distance short of the disc portion 33 and which is joined to that disc portion by a wall portion 37 nearer to the axis than the outer portions of the shell wall. Through the bulge 36, and extending from its inwardly exposed lower extremity to somewhat outwardly of its outer extremity, there may be sealedly inset a rigid tube 89 whose inner (lower-shown) extremity may be provided with a flange 88 directed toward the tube's axis to form a plane valve seat, and which for a substantial distance inwardly from its outer extremity may be internally threaded. Inwardly into the tube 89 from its outer extremity may be screwed a valve 85 having the axial stem 86 carrying at its inner extremity a small disc 87 having a resilient inner surface adapted to rest against the seat 88 thereby to close the valve. The stem 86 will be biased by means (not shown) internal of the valve so that it normally presses the disc 87 against the seat 88 with a force corresponding to that which will be exerted from within the keg against the disc 87 at the maximum intra-keg pressure which it is desired be permitted—and it will be understood that the disc 87 will be raised from the seat 88, and the valve thus opened by, and with the effect of relieving, intra-keg pressures in excess of that maximum.

On the other hand an excess-pressure relief means leading from the pressure chamber 80 to the ambient is simply provided in the part of the disc portion 33 of the shell which lies between the adapter 39 and the wall portion 37. Here, extending from the inner surface of 33 to somewhat outwardly of its outer surface, there may be sealedly inset through the disc portion 33 a rigid tube 94 having at its inner extremity a valve seat 93, and within the tube 94 may be the valve 90 with stem 91 and disc 92—all in correspondence to 89—88—85—86—87 above described. The stem 91 will be biased so that it normally presses the disc 92 against the seat 93 with a force corresponding to that which will be exerted from within the pressure chamber 80 against the disc 92 at the maximum intra-chamber pressure which it is desired be permitted—and it will be understood that the disc 92 will be raised from the seat 93, and the valve thus opened by, and with the effect of relieving, intra-chamber pressures in excess of that maximum.

Attention may now be more detailedly directed to the chamber 70 and to the means therein which bias the diaphragm 65 outwardly toward the stem head 63 in opposition to the force exerted on the diaphragm by the pressure in the pressure chamber 80. It was brought out early hereinabove that when for example carbon dioxide is used both to pressurize the beverage in the keg and to provide a source from which the proper amount of that gas may be maintained in the beverage, the pressure of the carbon dioxide in the space within the keg should—in order to maintain an essentially constant ratio of the volume of carbon dioxide in the beverage to the volume of the beverage, and thus to maintain best palatability of the beverage—be varied in an appropriate manner with the temperature of the space within the keg and thus of the stored beverage. In this embodiment of the invention this variation is accomplished by modifying the response of the pressure controlling valve 60, to the pressure in the space within the keg, in accordance with the temperature of that space—more specifically, by modifying the positional response of the valve-controlling diaphragm 65 to that pressure in accordance with that temperature. The chamber 70, which may conveniently be termed a temperature chamber, constitutes a means for effecting such modification; it performs that function by virtue of means in the chamber which subject the diaphragm to an outward bias which is dependent on that temperature—more specifically, by virtue of means in the chamber which develop therein a pressure thus dependent.

In a diaphragm system such as above described the diaphragm will always seek a position of equilibrium of the several forces acting on it. If the diaphragm be significantly out of the plane which it would occupy in the absence of forces from outside itself, then one of the forces acting on it will be the spring force developed in the diaphragm itself—a parameter hard to control precisely, and prone to some variation over a period of use. It is therefore highly desirable that the diaphragm perform its critical functions while in that plane. This in turn calls for the development in the chamber 70 of a pressure substantially equal at each temperature to the pressure which will be exerted on its outer surface (diaphragm 65) under conditions of pressure in the general space within the keg proper for that temperature. More specifically, there should be developed in the chamber 70 at each temperature a pressure equal to the pressure which at that temperature is proper in the general intra-keg space, augmented by the abovementioned factors of (a) the small fixed pressure differential characteristic of the check valve 83 and (b) that pressure on the diaphragm which is equivalent to the force acting on the movable part of the valve 60 to hold it closed or to close it. These factors (a) and (b), which are independent of temperature, will have an aggregate value which will vary from design to design and which must be determined by test for any particular design; it may be mentioned, however that in a typical structure of the FIGURE 2 variety their aggregate value may be of the order of 1.6 p.s.i.

It will here be helpful to refer to FIGURE 4, which is a plot whose ordinates denote absolute pressures in p.s.i. and whose abscissae denote temperatures in degrees Fahrenheit, and is presented particularly for the case of beer as the beverage. Herein there are shown as curve A the pressures which at various temperatures must be maintained in the general space within the keg in order that the beer shall contain 2.5 volumes of carbon dioxide per 1 volume of beer. Area B, located above curve A, has a center line (not shown) equivalent to curve A displaced upwardly by the 1.6 p.s.i. mentioned above (as the typical effect of factors (a) and (b)), so that center line would portray the pressure conditions required, in accordance with the preceding paragraph, in the temperature chamber 70. There is of course some tolerance to variation of the 2.5:1 volume ratio—one of plus or minus 0.06:1 (2.4%) being for example a very conservative one, involving negligible influence on palatability of the beer. B has been shown as an area rather than as a single-line curve in order to portray the effect of such a tolerance; in other words, its lower boundary shows the pressures which at various temperatures must exist within the temperature chamber 70 in order that the beer shall contain 2.44 volumes, and whose upper boundary shows the pressures which must there exist in order that the beer shall contain 2.56 volumes of carbon dioxide per 1 volume of beer. The pressure-developing means in the chamber 70 will desirably develop, at the various temperatures in the 35°–55° F. range, pressures which lie within area B.

It has heretofore been suggested in somewhat though by no means wholly analogous connections that sulfur dioxide ($SO_2$) vapor might have a useful pressure-temperature characteristic, and such characteristic of that substance appears in FIGURE 4 as curve C. It is immediately apparent that a simple sulfur dioxide vapor does not meet the requirement (and that it could do so only if the aggregate of the factors (a) and (b) could be held down to about 0.2 p.s.i., which is usually quite impracticable).

We have observed that the characteristic of simple sulfur dioxide may be modified or shifted upwardly so that in the 35°–55° F. range it lies wholly within area B, by incorporating in the chamber 70 along with the sulfur dioxide a supplementary ingredient consisting of a gas at a partial pressure of some 1.4 p.s.i.; the resulting pressure-temperature characteristic is shown in FIGURE 4 as D, which will be seen to lie as just stated. Many gases are available for this purpose, one example being nitrogen ($N_2$). It is, however, true that air may be employed as the gas for this purpose—and this of course has the advantage that instead of having first to evacuate the space within the chamber and then to introduce the required quantity of gas, it is necessary only that the normal air pressure be drawn down to the desired value of 1.45 p.s.i. The air should be dry air, and of course in either event the sulfur dioxide must be introduced at an appropriate stage.

A simple but by no means exclusive method by which to assemble and charge the chamber 70 is to place the diaphragm 65 and dome 69, in their final mutual relationship and with a chilled small slug of sulfur dioxide positioned between them, in a suitable fixture in a resistance-welding machine, to reduce the ambient air pressure to 1.4 p.s.i., to press the diaphragm and dome tightly together around their peripheries, and there to apply welding current to form a hermetically sealed chamber in which will be contained air at a partial pressure of 1.4 p.s.i. and the quantity of sulfur dioxide comprised in the slug—which latter will in due course warm up and assume the state of liquid-vapor equilibrium usual to its presence in an enclosed space. It may be desirable after the sealing has been accomplished and before that warming up has occurred to place the chamber 70 in a restrictive fixture to preclude excessive distension of the diaphragm, until that chamber is assembled in the unit 30—whereafter under any condition either the stem head 63 or the outer confine of the pressure chamber 80 is available for that purpose.

It will be recalled that a requirement for the unit 30 is that it be amenable to washing and sterilizing in preparation for re-use—operations which are commonly carried out at temperatures of the general order of 200° F. On the other hand the basic pressure-temperature characteristic of sulfur dioxide would involve a pressure at that temperature of the order of 300 p.s.i.—which if generated within the temperature chamber 70 would strain and probably disrupt the diaphragm 65 in spite of the limitations on its distension provided by the pressure chamber 80. We cope with this problem by limiting the quantity of sulfur dioxide introduced into the chamber 70 to a quantity which will be wholly in the vapor state at and above a temperature a little over the here-important range of 35°–55° F., e.g. at and above a temperature of approximately 70° F. It is for this reason that the curve D of FIGURE 4 exhibits a "knee" at approximately 70° F.

and rises only slowly with increasing temperature therebeyond; while for reasons of space curve D is not carried on to show the 200° F. area, it may be mentioned that its ordinate at 200° F. is only slightly over 60 p.s.i.

It is to be observed that the chamber 70 is a localized one, which will assume essentially a constant temperature throughout; thus there is no possibility of failure of response of the vapor pressure therein to temperature, such as can result in unlocalized enclosures from condensation of the sulfur dioxide in some remote and relatively cooler part of the enclosure.

The surface of the shell 31 exposed to the space within the keg and the surfaces of the rings 76 and 78 and of the dome 69, assuming those parts to be of metal, are desirably coated with a suitable non-metallic compound, which may for example be an epoxy resin sprayed thereonto and cured at an elevated temperature. Desirably this coating will be effected after the assembly and adjustment of the unit (of course other than for the pressure reservoir 50, which in this embodiment is an element intended to be replaced on each re-use, and for the O-ring 20 and cover disc 29 and C-ring 15). The tolerance of the temperature chamber 70 to elevated temperatures, discussed above in connection with washing and sterilizing, is also important in connection with the curing involved in the coating operation.

Attention may now be directed to a typical process of inserting and sealing the unit 30 in the keg; this is desirably integrated with the filling of the keg with the beverage—which will here be assumed to be beer, in view of the relatively more stringent requirements to be met in connection with that than with various other beverages. With the keg upright, bringing the aperture 11 at the top, beer will be metered into the keg in a quantity which will insure that when the unit is placed in the keg the general space within the keg will be entirely filled with beer, permissibly with some froth but with no air whatsoever. The shell 31 and parts carried thereby will be lowered through the aperture so that the shell flange 32 rests on the as-yet uncompressed O-ring 20, which may previously have been rested on the aperture-rim flange 12.

The capsule 50 will now be inserted—or it may previously have been inserted—into the space within the shell 31 with its neck 51 brought into the enlarged upper portion of the passage 40 sufficiently so that it is gripped by the small O-ring 49 but insufficiently for its diaphragm 52 to have been brought into contact with the tube extremity 47. The cover disc 29 may now be rested on top of the capsule 50, its periphery for example lying just at the mouth of the aperture 11. FIGURE 3 fractionally illustrates the apparatus in this state of affairs.

It should be appreciated that now the passage 40, taken with the pressure chamber 80 and duct 81, already provides from the pressure reservoir 50 a discharge path whose discharge extremity (check valve 83) is immersed in the beer; true, the valve 60 is interposed in the path, but since the pressure in the general space within the keg is still simply atmospheric pressure the valve 60 will stand opened by the diaphragm 65. The one element at the moment closing this discharge path is the diaphragm 52 in the neck of the pressure capsule—and the instant the capsule is moved downwardly sufficiently so that this diaphragm is pierced by the tube extremity 47, there will be a rush of carbon dioxide under pressure into the space within the keg, now occupied by beer, and beer will tend to spray out around the still uncompressed O-ring 20 in a thoroughly messy and wasteful manner.

The parts are, however, so disposed that the same stroke—a downward one on the cover disc 29—which will move the capsule 50 downwardly and thus cause the puncturing of the diaphragm 52 may be continued to promptly press the periphery of the cover disc against the shell flange 32 and the latter against the O-ring 20, thus sealing the unit against the aperture 11. This single stroke may for example be administered by a powerful ram (not shown), and while the ram pressure is still being applied to the cover disc the C-ring 15, in sufficiently shrunken or collapsed condition, may be slipped into position and allowed to expand into the annular slot 13—the C-ring then being in position to maintain the sealing of the unit after the removal of the ram pressure.

The inner (bottom) surface of the cover disc 29 may be provided with a central curved recess 27 at least approximately fitting the contour of the outer end of the pressure capsule 50; thus the cover disc serves not only to hold that capsule in place (against the force of the pressure therewithin, which of course would otherwise result in its immediate ejection), but also to locate the capsule laterally within the shell 31.

The outer (upper) surface of the cover disc 29 is raised somewhat throughout the non-peripheral portion of the disc, being separated from the peripheral portion by a shoulder or curb 26. The difference between the radius of the outer portion of aperture 11 and the radius of the curb is made at least slightly less than the width (i.e., dimension between inner and outer edges) of the C-ring 15, with the result that that C-ring cannot be made either to enter or to leave its slot 13 unless the cover disc be temporarily depressed below its normal (FIGURE 2) position by at least the height of the curb. Such depression, requiring a temporary extra compression of the O-ring 20, is readily effected (as by the ram mentioned above) at the bottling or filling establishment, but the need for it quite effectively frustrates amateur attempts at the removal of the unit from the keg.

In brief review, the ordinary operation of the FIGURE 2–3 structure (the keg being wholly or partially filled with beer) is governed by the position of the diaphragm 65; this position is in turn basically responsive to the pressure in the pressure chamber 80, which is substantially the same as the pressure in the general space within the keg (that chamber being separated from that space by check valve 83 to avoid the beer coming into contact with valve 60). So long as that pressure is of proper value (both for maintenance of a suitable degree of carbonation of the beer and for forcing of the beer out through tube 9 when spigot 7 of FIGURE 1 is opened) the diaphragm will be positioned so that valve 60 will just be closed. But whenever that pressure drops to less than that proper value the diaphragm will move to open the valve 60 whereupon carbon dioxide will be released from the pressure reservoir 50 through valve 60 into the pressure chamber 80, from which it is free to discharge through check valve 83 into the space within the keg; when the pressure has again risen to the proper value the diaphragm will move again just to close the valve 60. The response of the diaphragm 65 to the pressure in the pressure chamber 80 is modified in accordance with the temperature of the keg contents by the influence of that temperature (through the metallic dome 69) on the contents of the sealed temperature chamber 70; the higher that temperature the greater will be the pressure within chamber 70 and the higher will be the pressure in the pressure chamber 80 and within the keg at which the valve 60 will just be closed.

In FIGURES 5 through 7 there is illustrated a simplified unit 100 modified in several respects from that of FIGURE 2. The temperature compensation is omitted; the reentrant shell 31 of the earlier construction is omitted; and the pressure reservoir, now contained in the general space within the keg, is made a permanent (though when necessary removable) part of the unit.

For the unit 100 the keg top may be formed essentially as for the unit 30, with the aperture 11 and its flange 12, and for the sealing of the unit against the aperture there will again be used the O-ring 20; there may, however, desirably be specific differences in the C-ring (15 of FIGURE 2) and the annular slot therefor (13 of FIGURE 2) as hereinafter mentioned. The element of the unit 100 which is itself sealed to the aperture and to which the remainder of the unit (other than its cover member) is secured is a generally cylindrical and axially short base member 101, provided at its outer extremity with an exteriorly extending flange 102 which when the unit is in position in the keg will rest against the O-ring 20 as did the flange 32 of FIGURE 2. A short distance inwardly from its outer extremity the base member is provided with two successive interiorly extending shoulders 106 and 107 of progressively reducing internal diameters. The base member 101 may typically be of metal.

Inwardly of the shoulder 107 the base member 101 may have a saucer-shaped contour, as indicated at 109, and below this contour the member 101 may terminate in a disc portion 110, the central area of which may be provided with a shouldered aperture 111. In this aperture may be positioned a cylindrical adapter 112, typically of metal, having at its outer extremity a slight flange 113 which rests against the shoulder of the aperture 111, and from the disc portion 110 extending inwardly for a distance to terminate in an externally threaded portion 114. Axially through the adapter there may be provided a passage 115, which (like the passage 40 of FIGURE 2) forms the avenue through which pressure will be introduced into the space within the keg.

A generally cylindrical pressure reservoir 120, for example of internal diameter slightly larger than the threaded adapter portion 114 but having a neck 121 which is internally slightly constricted and threaded, may be screwed onto that adapter portion and into substantial abutment against the inner surface of the disc portion 110. Into the interior peripheral corner of the neck 121 there may be inset a rubber O-ring 119 of such dimensions that as the reservoir 120 is screwed in place that O-ring will be pressed into sealing contact with the surfaces of the disc portion 110, of the adapter 112 and of the pressure reservoir 120. From the disc portion 110 the reservoir 120 will extend inwardly, for example terminating at its inner extremity in an exteriorly rounded heavy end portion 122.

In this embodiment the pressure reservoir 120 will be charged while the unit 100 is outside the keg, and this charging is done through a fitting 127 provided axially in the reservoir end portion 122. This fitting will be screwed into an axial hole 123 in that end portion, a suitable small rubber O-ring 124 serving to seal the joint between fitting and reservoir. This fitting may be provided with a suitable axial aperture 126 and, within that aperture, with a valve 125 of the same type as the valve 60 of FIGURE 2—the purpose of which however is not a regulating one, but rather simply the admittance of pressure to the reservoir during its charging and the blocking at other times of egress of that pressure therefrom. The fitting 127 may protrude inwardly (i.e., downwardly in FIGURE 5) for a short distance beyond the end portion 122, and may be provided with a bayonet arrangement 128 to which during charging there may be secured a suitable coupling provided at the end of a charging hose (not shown), and which at other times may serve to hold in place across the fitting a suitable cover or cap 129.

In the passage 115, near its outer extremity, there is interposed the valve which is to regulate the transmission of pressure from the reservoir 120 to the general space within the keg; this valve may be entirely similar to the valve 60 of FIGURE 2 and has accordingly been similarly designated. The passage 115 will of course be formed with a frusto-conical seat 59 similar to the seat 59 of FIGURE 2, and the valve with a frusto-conical surface 61 similar to 61 of that figure. The valve 60 will again have the stem 62 and stem head 63—but in this embodiment it is convenient to secure (as by snapping) therearound a small hemispherical rubber cap 64, conveniently hereinafter referred to as the stem cap.

As in the case of FIGURE 2, the valve 60 is made normally responsive to the pressure in the space within the keg, again this may be done by an element in adjacency to the stem head (here more precisely to the stem cap 64) and movable in a direction axial of the valve stem, and again this element may be the diaphragm of a diaphragm system which comprises it and means biasing it against the stem head (here in an outward direction, against the stem cap 64). Both the diaphragm system and the diaphragm, however, are specifically different from those of FIGURE 2.

The diaphragm, designated as 135, may be a disc of rubber whose peripheral portion is held inwardly against the inner shoulder 107 abovementioned—in the center of which shoulders there is desirably formed a slight raised circular ridge 108 over which the rubber of the diaphragm will be deformed to insure a hermetic seal to the shoulder. Such holding may be accomplished by a thick externally threaded disc member 145 screwed inwardly, into internal threading provided for the purpose in the cylindrical base member 101 near its mouth, into abutment of its inwardly extending peripheral portion 146 against the outer shoulder 106 and serving when in such abutment to compress the peripheral portion of the diaphragm 135 between the shoulder 107 and a flat ring 137 interposed between the diaphragm and the disc member 145. Both the disc member 145 and the ring 137 may for example be of metal.

As to this embodiment there is conveniently next described its biasing means, which may comprise a mechanical spring. To accommodate this spring there may be secured on the outer surface of the diaphragm a thin disc 133, for example of metal, extending over the central portion of the diaphragm but still leaving a substantial margin between that disc and the ring 137—the diaphragm and the disc 133 being provided with respective central holes 136 and 134 for a purpose later apparent. The disc 133 may be provided with a number (for example four) of outwardly folded ears 132 circularly arranged about its center, and within the circle defined by these ears there may bear against the disc the inner extremity of the compressible helical spring 138. The outer extremity of this spring may bear against the inner surface of a shallow cup member 142, which within the periphery of the spring extremity may be formed inwardly, and which is disposed within a large central aperture in the disc member 145. Within the inward formation of the cup member 142 there may be secured to the outer central surface of that member a centrally appertured and threaded bushing 141, the bushing for example having a portion extending inwardly through, and peened over against the rim of, a central aperture in the cup member. A screw 140, preferably thin-cap-headed, is threaded adjustably through the bushing 141; in order to avoid unwanted rotation of the cup member 142 during turning of the screw, that member may be provided with a pair of ears 143 extending away from its axis and fitting freely into respective slots 147 in the disc member 145. The head of the screw 140, when the unit is sealed in position in the keg, bears outwardly against the inner surface of the cover disc 160 which, itself hereinafter more fully described, is then held against the outer surface of the flange 102.

As before the diaphragm will assume a position wherein its net bias (here inward) is in equilibrium with the force exerted on its surface (here its inner surface) by the pressure in the general space within the keg, augmented by factors identical with (a) and (b) abovementioned in connection with FIGURE 2. It is therefore, as before, ideally required that the diaphragm, when in position just to open or just to close the valve 60, have applied to it a net biasing force equal to the force applied to its exposed (here inner) surface by the proper intra-keg pressure, augmented as abovementioned. In this embodiment there is of course no temperature compensation, or variation of the bias with temperature, and accordingly the net biasing force applied to the diaphragm must be established at a value appropriate to the intra-keg pressure, augmented as abovementioned, at some standard temperature expected to be approximately maintained within the keg during its storage for use of its contents. If that standard temperature be selected, the proper intra-keg pressure will be that intersected at that temperature by the longitudinal center line of area A in FIGURE 4, and that proper intra-keg pressure augmented as abovementioned will be that intersected at that temperature by the longitudinal center line of area B.

The net bias in the unit of FIGURE 5 is readily adjusted to the appropriate value by adjusting the screw 140 (thereby adjusting the compression of the spring 138), while applying to the inner surface of the diaphragm the pressure proper in accordance with the preceding paragraph, so that the diaphragm will be in contact with the stem cap 64 and will be pressing thereagainst with a force infinitesimally less than required to move that stem cap and thus to open the valve 60. Thereafter the diaphragm—assuming the maintenance in the space within the keg of the selected standard temperature—will function as above described for the diaphragm 65 of FIGURE 2.

It is still desirable that the diaphragm when in position just to open or just to close the valve 60 be not significantly out of the plane which it would occupy in the absence of forces from outside itself—but somewhat more tolerance to deviations from compliance with that criterion can be tolerated in the structure of FIGURE 5 than in that of FIGURE 2. In the FIGURE 5 structure the components may be so proportioned that, in the absence of any spring pressure on the diaphragm, the stem cap 64 will be spaced away from contact with the diaphragm by a very small distance as to which some tolerance may be permitted; the adjustment described in the preceding paragraph will inherently displace the diaphragm to eliminate this spacing. It is true that this will impose on the diaphragm some slight restoring force generated within itself, but if sufficiently limited in magnitude this will not be subject to seriously disturbing variations with use. It is also true that the restoring force thus generated makes a small negative contribution to the bias of the diaphragm, and any such contribution—as well, of course, as the positive contribution by atmospheric pressure on the outer surface of the diaphragm—is intended to be taken into account by the use above of the term "net bias."

Again the diaphragm forms with its environs—in this embodiment the saucer-shaped outer surface of the disc portion 110—a pressure chamber herein designated as 150, sealed off, as thus far described, from the general space within the keg. Again it is necessary to undo, to an appropriate degree, the effects of that sealing-off, and a complete such undoing may be accomplished by providing, through the disc portion 110, a duct 151 leading from the space 150 to the general space within the keg. Again a one-way-only communication from the space under discussion to the general intra-keg space is sufficient and desirable; it may be provided for by an extension 152 of the duct 150, and the attaching thereto of a length of normally collapsed rubber tubing 83, identical with the similarly numbered element in FIGURE 2, to form a check valve.

In the structure of FIGURE 5 an excess-pressure relief means from the pressure chamber 150 to the ambient is provided by the central holes 136 and 134 in the diaphragm 135 and disc 133, abovementioned. As has been seen above, when the proper pressure exists in the general space within the keg the diaphragm 135 will be pressing against the stem cap 64; the hole 136, being much smaller in diameter than the stem cap, will then be very effectively closed. If for any reason, however, excess pressure is developed in the pressure chamber, it will move the diaphragm outwardly against the force of its bias, thereby opening and relieving itself through the holes 136—134.

Since the pressure chamber 150 is thus relatively simply and positively protected against excess pressures, it may be considered warrantable to discharge into it any excess pressure which may be developed in the general space within the keg—and this has the advantage of avoiding any competition between such means and the diaphragm for space on the base unit 101. Accordingly in FIGURE 5 there will be seen passing through and sealedly inset into the disc portion 110, for example on the opposite side of its axis from the check valve 83, a tube similar to the tube 89 of FIGURE 2 and similarly designated, and therewithin a valve 85 similar to the correspondingly designated one in that figure.

It will be understood that any rupture of the pressure reservoir in the structure of FIGURE 5 will result in the development of excess pressure within the keg, which must and can relieve itself sequentially through the valve 85 and the holes 136—134.

It may be considered desirable to provide an excess-pressure relief means leading directly from the pressure reservoir, and in FIGURE 5 such means has been shown leading therefrom into the pressure chamber 150. Since such means is highly precautionary and will seldom be called into play, it may be considered permissible that it be a rupturable one, requiring replacement after its action. In FIGURE 5 there has been shown passing through the disc portion 110 near its axis a hole 154, enlarged in its inward portion to form a shoulder 155, and in that portion internally threaded. By a centrally apertured bushing 156 screwed into this hole there may be held against this shoulder a thin disc 157, for example of metal, rupturable under the force of some predetermined excessive pressure in the reservoir, applied to the disc through the suitably diametered aperture in the bushing.

In the structure of FIGURE 5 the spaces between the disc member 145 and the diaphragm and between that member and the cover member 160 may tend during the process of sealing the unit in the keg to entrap small quantities of the beverage forced out around the O-ring prior to the completion of sealing; these spaces are, however, so configured that in the absence of special provisions they will not drain and that entrapped beverage will accordingly remain therein, with possibilities of souring and the like. To provide against this contingency simple special provisions may be made, for example at each of three regions equally angularly spaced around the axis—one of which may be the region through which passes the plane of FIGURE 5 to the right of the axis.

First, there may be provided at each of these regions a respective hole 148 through the disc member 145 leading, from the corner formed between the inwardly extending peripheral portion 146 and the central inner surface of that member, diagonally outwardly and away from the axis. Secondly, at each of these regions there may be formed in the outer surface of the base-member flange 102 a respective inward channel or trough 104. Thirdly, in the cover member 160 at each of these regions, immediately above the respective trough 104, there may be provided a respective hole 162. Fourthly, at each of these regions the central top portion 10 of the keg may be provided with a hole 18 leading, from the annular slot (in FIGURE 5, designated 14) in which the C-ring is retained, diagonally outwardly and away from the axis (in addition to which the C-ring may if desired be suitably configured or otherwise arranged to be traversable by liquid). It will readily be appreciated that these provisions will serve fully to drain the spaces abovementioned, either when the keg is stood on its top, or when it is laid on its side with one of the three regions vertically below its axis—for which purpose one of the regions (for example that shown in section in FIGURE 5) may be aligned about the axis with the flat side portion 3 on which the keg is to rest during storage for use—or when the keg is slowly rolled.

The C-ring of FIGURE 2 was disclosed as one necessarily removed from the annular slot 13 except when the unit 30 was in sealed position in the keg, and requiring collapse or shrinking of its diameter in order to permit its insertion in or removal from that slot. Alternatively it is possible to arrange the C-ring so that it is always retained within the annular slot, and so that it is to be expanded within that slot to permit the insertion or removal of the unit. This alternative arrangement has been shown in FIGURE 5. To embody it the diameter of the annular slot, here designated 14, is made larger, and the diameter of the aperture 11 between that slot and the exterior surface of the top is also enlarged somewhat as indicated at 6. The C-ring, designated as 16, is normally of a diameter intermediate the two diameters just mentioned, and must of course be shrunk initially to introduce it into the slot 14. To facilitate expansion of the C-ring when the unit 100 is to be inserted or removed the C-ring 16 may be provided with additional outward thickness which forms with its remainder a shoulder 17 against which expanding force may be applied. The annular slot 14 is of course made of an axial dimension increased first to accommodate the thicker C-ring, and desirably slightly more to facilitate drainage. The cover member 160 may be formed with an outwardly extending circular ridge 161 immediately within the inner rim of the normally-diametered C-ring, so that it will be centered by the C-ring—it being for example in this ridge that the holes 162 are provided. A peripheral outwardly extending small circular lip 103 on the base-member flange 102, within which the cover member 160 just fits, may in turn serve to center the unit 100 in the aperture.

In preparation for the insertion and sealing of the unit 100 in the keg the beverage, e.g. beer, will be metered into the keg as described above for the unit 30; then, with the C-ring 16 expanded, the unit 100 will be lowered through the aperture so that the flange 102 rests on the O-ring 20 and that in turn on the aperture-rim flange 12, and the cover member 160 will be rested on the head of the screw 140. FIGURE 6 fractionally illustrates the apparatus in this state of affairs. The passage 115, taken with the pressure chamber 150 and duct 151, already provides from the pressure reservoir 120 a discharge path whose discharge extremity (check valve 83) is immersed in the beer. This path is initially closed, since the valve-opening means—diaphragm 135—has not yet been activated by the spring 138; that means will however become activated as the spring is compressed, and thereupon there will be the same rush of pressure into the space within the keg, with the same spraying tendencies, as above discussed in connection with FIGURES 2 and 3. Again, however, the parts are so disposed as to foreclose the dilemma; the same stroke—a downward one on the cover member 160—which will compress the spring and thus activate the diaphragm may be continued to promptly press the periphery of the cover member 160 against the base-member flange 102 and the latter against the O-ring 20, thus sealing the aperture 11, whereupon the C-ring will be allowed to contract to normal condition and the ram pressure then removed.

The brief review presented above of the ordinary operation of the FIGURES 2–3 structure is equally applicable to the FIGURES 5–7 structure (the diaphragm now being 135, the pressure chamber being 150 and the pressure reservoir being 120), excepting that the simple spring 138 has replaced the temperature chamber 70 and accordingly temperature-effected modification of the response of the diaphragm is absent.

In FIGURES 8 through 10 there is illustrated a further modified unit 170. The temperature compensation is again omitted, but a reentrant shell as in the FIGURE 2 construction is reemployed; the pressure reservoir, disposed within that shell as in FIGURE 2, is of the permanent (though when necessary removable) type used in the FIGURE 5 construction.

For the unit 170 the keg top may be formed just as for the unit 30. The generally cylindrical reentrant shell is designated as 171; it is provided at its outer extremity with the flange 172 extending away from its axis, adapted to be pressed against the O-ring 20 to seal the unit to the aperture 11 and held thus pressed by the C-ring 13 quite similar to that of FIGURE 2. No cover member is basically required (though a thin one, not shown, might be used) with this embodiment, and the flange 172 is thicker than the flange 32 in FIGURE 2— appropriately to the here-preferred formation of the shell 171 as a molding of non-metallic plastic or phenolic composition.

As seen in FIGURES 8 and 9 (which are sections whose planes are at right angles to each other) the shell 171, after extending inwardly in cylindrical formation for a substantial distance, may in its further inward extent taper toward its axis to merge in reduced diameter into a centrally apertured end wall 173 which may be considered as forming the inner extremity of the shell proper. The material of the shell may, however, be continued inwardly (downwardly in FIGURES 8 and 9) beyond the end wall 173 to form a cup—inverted as seen in FIGURES 8 and 9—having a cylindrical side 175 approximately aligned with the cylindrical outward portion of the shell, and of which the end wall 173 serves as the central "bottom" portion; furthermore there are significant local digressions, which will be hereinafter mentioned, of the shell proper from the tapering configuration mentioned above.

The central aperture of the end wall 173 may be closed by an adapter 179, inserted therethrough from the inner face of the end wall until a thin flange 181 on the adapter lies within a slight recess 174 in that end-wall face, and from the end wall extending outwardly for a distance to terminate in an externally threaded portion 182. Axially through the adapter 179 there may be provided a passage 180 for the introduction into the space within the keg of pressure from a pressure reservoir 190. This reservoir, generally cylindrical but having a reduced-diameter internally threaded neck 189, is screwed onto the adapter portion 182 until that neck comes into abutment against a metallic washer 187 inset into the outer surface of the end wall 173 immediately around the adapter. Small rubber O-rings 188 and 186, inset respectively into the neck 189 and into the inner surface of the end wall 173 immediately around the adapter, serve hermetically to seal together the end wall, adapter and reservoir. From the end wall 173 the pressure reservoir 190 may extend outwardly within the shell 171 almost but not quite to the plane of the outer surface of the flange 172, there terminating in a thick end member 191 which may if desired be separately fabricated, screwed to the remainder of the pressure reservoir, and sealed thereto as by the rubber O-ring 192 inset into the interior corner of the periphery of that remainder.

The shell 171 may desirably be formed with longitudinal reinforcing ribs 169 (seen in FIGURE 10) extending into close adjacency to the pressure reservoir, and conveniently providing guides for the approximate centering of the reservoir during its original insertion into place in the unit.

Unlike either of the foregoing embodiments, this embodiment is so arranged as to permit the pressure reservoir to be first placed (as a part of the unit 170) in operative position in the keg, and thereafter charged—a facility sometimes of considerable convenience in the filling procedures followed in a particular establishment. For this purpose of charging, at whatever stage effected, there is screwed into a suitable axial hole 193 in the reservoir end member 191, and sealed thereto as by a small rubber O-ring 194, a fitting which, though fundamentally for the same function as the fitting 127 of FIGURE 5, may conveniently be somewhat different specifically and is accordingly designated 197. It may extend inwardly somewhat beyond the inner face of the end member 191, and may be provided with a suitable axial aperture 196 and, within the inner portion of that aperture, with a valve 125 entirely similar to the like-numbered valve of FIGURE 5. In its outer portion the aperture 196 may be slightly enlarged, and at the inner extremity of this enlarged portion may lie a metal washer 198; inwardly into the aperture to rest against this washer, there may be inserted a rubber bushing 199 having a small-diameter axial hole through which, for charging of the reservoir, there may be introduced to near the valve 125 the terminal "needle" (not shown) of a charging hose—the bushing 199 during charging being held by suitable means (not shown) on the charging hose against outward expulsion, and serving to seal the needle to the fitting.

In the passage 180, suitably formed for the purpose, there is interposed the pressure-regulating valve 60 with inwardly extending stem 62 and stem head 63 as in FIGURE 2. As in previous embodiments, the valve is made normally responsive to the pressure in the space within the keg, by the diaphragm of a diaphragm system; that system is in a general sense like that of FIGURE 5, as distinguished from that of FIGURE 2, but there are specific differences. The diaphragm, designated as 205, may be a disc of rubber whose peripheral portion is held outwardly against an inwardly exposed shoulder 177 which extends toward the axis from the cup side 175 in a plane spaced a little inwardly from the end wall 107. This holding may be accomplished by a thick externally threaded disc member 215, for example of material similar to that of the shell 171, screwed in suitable internal threading provided in the cup side 175 into abutment against a second shoulder 176 of larger diameter than and slightly displaced inwardly from the shoulder 177, and serving when in such abutment to compress the peripheral portion of the diaphragm 135 between the shoulder 177 and a flat metallic ring 207 interposed between the diaphragm and the disc member 215. A slight raised circular ridge 178 may be provided in the center of the shoulder 177 over which the rubber of the diaphragm will be deformed to insure a hermetic seal to the shoulder.

The diaphragm may be formed with an inwardly extending central rubber button 204 undercut immediately adjacent the diaphragm, and over this button may be snapped, to be retained by the undercutting in contact with the inner face of the diaphragm, a centrally apertured thin metal disc 203 of diameter which will leave a substantial margin between it and the ring 207. The diaphragm may further be formed with an outwardly extending central small flanged pocket 206 into which may be snapped and which will retain a small metal disc 201 which will provide a hard surface for the bearing of the diaphragm against the stem head 63.

As in FIGURE 5, the biasing means in the diaphragm system of FIGURE 8 consists of a helical spring, here numbered 208 and having its outer extremity bearing against the disc 203 and therethrough against the diaphragm. To provide for the mounting of the spring the disc member 215 may be centrally apertured and threaded, and into it may be adjustably screwed the externally threaded side of a cup member 212 (for example of material similar to that of the shell 171) whose "bottom" may be inwardly disposed; the spring may be retained within this cup member, and its outer extremity may bear inwardly against the cup-member bottom. That cup-member bottom may be provided with holes 210, displaced from its axis, which may be engaged by a suitable tool in order to turn the cup member for inward and outward adjustment of the cup member and consequent adjustment of the compression of spring 208. After a proper such adjustment has been effected the inner end of the unit 170 may be closed by an appropriate circular cap 235 whose outer diameter may match that of the cup side 175, and from which there may extend outwardly an externally threaded cylindrical flange 236 which may be screwed into the internal threading on the cup side 175 so that the shoulder formed between that flange and the main body of the cap abuts against the rim of that cup side—desirably through a sealing ring or gasket 237, preferably nonmetallic, interposed therebetween.

Still again the diaphragm forms with its environs a pressure chamber, herein designated as 220, and again it is necessary that this chamber communicate, preferably in a one-way manner, with the general space within the keg. Such communication is provided by a duct 221 (see FIGURE 9) leading from that pressure chamber to that space, the duct being shown as provided with the extension 222 and therearound with the collapsed rubber tubing 83 to form a check valve as in earlier figures.

It will be appreciated that although the structure of FIGURE 8 is reversed as between inward and outward dispositions, adjustments and movements relative to that of FIGURE 5, nevertheless the functions of the valve 60 and of the diaphragm in controlling that valve, and the required adjustments of the diaphragm system, are actually entirely analogous in the two cases; they accordingly need not be redetailed.

In this connection there may however be mentioned the importance of maintaining the space between the disc member 215 and cup member 212 on the one hand, and the diaphragm 205 on the other (with which space the space between those members and the cap communicates at least through the holes 210), at atmospheric pressure—as the analogous space in the FIGURE 5 structure inherently is. Of course that space will have been at that pressure when originally sealed up by the cap 235 in an ordinary ambient, and it might ordinarily be expected to remain at that pressure indefinitely; it is, however, disposed between two spaces—the pressure chamber, and the general space within the keg—each of which is maintained at a higher pressure, and if any leakage whatsoever of one of those higher pressures into this sealed space occurs, however inconsequential that leakage might otherwise be the pressure-regulating function of the system will be impaired if not totally frustrated.

We cope with the problem of the preceding paragraph by venting the space under discussion to the ambient, so that any pressure leaking into that space will bleed harmlessly away as it does in the FIGURE 5 structure. A simple means of accomplishing this venting is to provide, at one angular position around the axis—for example, that illustrated at the left in FIGURE 8—an external rib 168 extending along an axial plane from the full-diameter outward portion of the shell 171 to the cup side 175, of course integral with those two members; to provide in that rib a small-diameter duct 217 extending, parallel to the axis, from the marginal portion of the space within the shell 171 to near the inner end of the cup side 175; and in that cup side to provide a small hole 218 from that duct to a point, on the internal threading, which lies between the disc member 215 and the cap 235. This duct and communicating hole of course serves to maintain the space under discussion at atmospheric pressure.

Excess-pressure relief means entirely analogous to valves 90 and 85 (and their respectively associated tubes 94 and 89 in which they are mounted) of FIGURE 2 may of course be provided, and have been shown, in the structure of FIGURES 8–10. Thus as seen in FIGURE 8 the otherwise tapering part of the shell 171 may be bulged away from the axis, for example on the opposite side of the axis from the rib 168, to provide a thickened portion 167 spaced somewhat outwardly from the end wall 173, and through this thickened portion 167 there may be inset the tube 94 and valve 90 described in connection with FIGURE 2 for the relief of excess pressure in the general space within the keg. Further, as seen in FIGURE 9 the otherwise tapering part of the shell 171 may be bulged away from the axis, for example on the opposite side of the axis from the check valve 83, sufficiently to provide an area within which the end wall 173 may itself have a thickened portion 166 through which there may be inset the tube 89 and valve 85 described in connection with FIGURE 2 for the relief of excess pressure in the pressure chamber.

From the pressure reservoir 190 there may be provided excess-pressure relief means generally analogous to 154—157 of FIGURE 5, but by way of example somewhat different specifically. Thus in FIGURE 8 there has been shown passing through the end member 191 to the side of the fitting 197 a hole 224, slightly enlarged in its outer portion to form a shoulder 225 on which may rest a sealing washer or gasket 226, and in that portion internally threaded. An appropriate disc 227—for example of metal and if desired centrally reinforced, and rupturable under the force of some predetermined excess pressure in the reservoir applied to it through the inner portion of the hole 224—may be held against this sealing washer by the pressure of an externally threaded bushing 228 screwed into the outer portion of the hole 224 and bearing against a metallic washer 229 interposed between bushing and disc. The inner portion of the bushing may be hollow, and the space therewithin may be placed in communication with the ambient by holes 230 passing through the head of the bushing—and preferably extending, parallel to the axis, partially into its side to minimize the possibility of their being wholly obstructed. These holes 230 also serve as small ports through which visual inspection may quickly determine whether any untoward event may have ruptured the disc 227—which in the event of rupture will be partially or wholly displaced outwardly toward, but will be retained against expulsion by, the head of the bushing.

In a typical preparation of the unit 170 for insertion in the keg the pressure reservoir will have been drained of any over-atmospheric pressure; the valve 60 will therefore at the time of insertion be open, but in the absence of reservoir pressure this will be of no consequence. The unit may therefore be inserted into the keg and sealed against the aperture 11 without any need to cope with problems of spray of the beverage out of the aperture before sealing—though there must of course still be employed some appropriate means for applying to the flange 172 a pressure suitable to permit the same manipulation of the C-ring 15 as set forth above in connection with FIGURE 2. It will be only after the insertion of the unit into the keg and its sealing to the aperture 11 and the insertion of the C-ring, that pressure will be introduced into the pressure reservoir 190—in the early part of which step there will automatically be established in the general space within the keg the proper pressure (temporarily modified to the extend that there is any difference between the then-existing temperature of that space and the predetermined one for which the diaphragm system has been adjusted), whereupon the valve 60 will simply close.

The brief review presented above of the ordinary operation of the FIGURE 2–3 structure is equally applicable to the FIGURE 8–10 structure (the diaphragm now being 205, the pressure chamber being 220 and the pressure reservoir being 190), excepting that the simple spring 208 has replaced the temperature chamber 70 and accordingly temperature-effected modification of the response of the diaphragm is absent.

While we have disclosed our invention in terms of specific embodiments thereof, we intend no unnecessary limitations by virtue of the details of those embodiments. Many modifications will be suggested by our disclosure to those skilled in the art, and such modifications will not necessarily constitute departures from the spirit of the invention or from its scope, which we undertake to define in the following claims.

We claim:
1. A pressurizing unit to be mounted within a keg at an aperture therein, comprising a shell adapted to extend inwardly from the rim of the aperture into the keg, the confines of the shell being traversed by a passage; a valve, normally responsive to the pressure in the space within the keg, interposed in the passage; and a pressure reservoir within, and having a wall of which an external portion lies along but is spaced from the shell, the reservoir communicating through the passage and the valve with the space within the keg but being sealed against communication with the adjacent space external to it and within the shell.

2. The subject matter claimed in claim 1, wherein said space external to the reservoir and within the shell is in substantially free communication with the ambient.

3. The subject matter claimed in claim 1, wherein said space external to the reservoir and within the shell is in substantially free communication with the ambient, and further including excess-pressure relief means traversing the confines of said shell and leading into said last-mentioned space.

4. The subject matter claimed in claim 1 wherein said passage and said valve are disposed at the inward end of said shell.

5. A pressurizing unit to be mounted within a keg at an aperture therein, comprising a shell adapted to extend inwardly from the rim of the aperture into the keg, the confines of the shell being traversed by a passage; a movable element supported interiorly of the keg by, but outside the confines of, the shell and normally responsive positionally to the pressure in the space within the keg; a valve interposed in the passage and controlled by said element; and a pressure reservoir within, and having a wall of which an external portion lies along but is spaced from, the shell, the reservoir communicating through the passage and the valve with the space within the keg but being sealed against communication with the adjacent space external to it and within the shell.

6. A pressurizing unit to be mounted within a keg at an aperture therein, comprising a shell adapted to extend inwardly from the rim of the aperture into the keg, the confines of the shell being traversed by a passage; a pressure reservoir within, and having a wall of which an external portion lies along but is spaced from, the shell, the reservoir communicating with one end of the passage but being sealed against communication with the adjacent space external to it and within the shell; a pressure chamber supported interiorly of the keg by, but outside the confines of, the shell and communicating with the other end of the passage; means providing for the discharge of pressure from the pressure chamber to the space within the keg; a movable element forming a portion of the confines of the pressure chamber and positionally responsive to the pressure therein; and a valve interposed in the passage and controlled by said element.

7. In apparatus for pressurizing beverage contained in a keg, the combination, with means controlled by the pressure in the space within the keg for supplying pressure to said space, of means for modifying the pressure thus supplied in accordance with the temperature in said space, said last-mentioned means comprising a sealed chamber operatively associated with said supplying means, exposed to the temperature in said space, containing a quantity of a substance in liquid-vapor equilibrium in the range of desired beverage temperatures, further containing a gas at small partial pressure, and expansible and contractible in response to the pressure exerted by its contents.

8. The subject matter claimed in claim 7, wherein said quantity of said substance is sufficiently limited so that it is wholly in the vapor state at temperatures substantially above said range.

9. In apparatus for pressurizing beer contained in a keg, the combination, with means controlled by the pressure in the space within the keg for supplying pressure to said space, of means for modifying the pressure thus supplied in accordance with the temperature in said space, said last-mentioned means comprising a sealed chamber operatively associated with said supplying means, exposed to the temperature in said space, containing a quantity of sulfur dioxide and further containing a gas at small partial pressure, and expansible and contractible in response to the pressure exerted by its contents.

10. In combination, a keg adapted to be filled with liquid, the keg being provided with an aperture through which it may be filled and through which the liquid in the keg when under pressure will tend to escape; a mechanism, including a pre-charged pressure reservoir and means providing an initially closed discharge path therefrom, insertible into the keg through the aperture thereby to immerse the discharge extremity of said path in the liquid within the keg, and sealable against the aperture thereby to close the aperture; an outer member comprised in said mechanism and linearly movable in an inward direction; and means contained in said mechanism for opening said path and means for sealing the mechanism against the aperture, both of said two last-recited means being responsive to a single linear inward movement of said outer member.

11. A pressurizing unit to be mounted within a keg at an aperture therein, comprising a shell adapted to extend inwardly from the rim of the aperture into the keg, the confines of the shell being traversed by a passage; a valve, normally responsive to the pressure in the space within the keg, interposed in the passage; a pressure reservoir within the shell and communicating through the passage and the valve with the space within the keg; and means responsive to the temperature of the space within the keg for modifying the response of the valve to the pressure in said space.

12. An apparatus for pressurizing the space within a keg at an aperture therein, a pressure-regulating mechanism adapted to be mounted within the keg, including a valve governing the admission of pressure to said space, a diaphragm controlling the valve and having respective surfaces facing generally inwardly and outwardly of the keg, and means effective on the surface of the diaphragm which faces inwardly of the keg for biasing diaphragm outwardly, the surface of the diaphragm which faces outwardly of the keg being exposed to pressure which is a function of that in the general space within the keg, and means forming with the diaphragm a space separate from the general space within the keg, and means leading from said separate space for venting the same to the ambient.

13. A pressurizing unit to be mounted within a keg at an aperture therein for pressurizing a carbonated beverage contained in the general space within the keg, comprising a member adapted to hermetically seal off the aperture of the keg, a pressure reservoir within said keg containing carbon dioxide at super-atmospheric pressure, valve means and connecting means within said keg for admitting carbon dioxide to the general space within said keg from said reservoir, pressure regulating means operatively associated with said valve means to operate said valve means and to control said admission of carbon dioxide to said general space, said pressure regulating means including a diaphragm whereby movement of said diaphragm controls said operation of said valve means, said diaphragm being subjected on its one side to the pressure of said general space within said keg and being subjected on its other side to a back pressure that varies in accordance with the temperature in said general space, said diaphragm movement controlling the delivery pressure of said admitted carbon dioxide whereby the carbon dioxide content of said carbonated beverage within said keg is maintained substantially constant in the range of desired beverage temperatures; said reservoir, said valve means, said connecting means, and said pressure regulating means all being mounted to and carried by said member.

14. Apparatus for pressurizing a beverage contained in general space within a keg, comprising a pressure reservoir, means conecting said reservoir with the general space within the keg for transferring pressure from said reservoir to said general space, valve means interposed in said connecting means governing said transfer of pressure to said general space, control means within said keg operatively associated with said valve means to control the operation of said valve means and to control said transfer of pressure, said control means including means responsive to the pressure in said general space and further including means responsive to the temperature within said general space, said temperature responsive means comprising a sealed chamber within said keg and enclosing a space within said keg whereby said enclosed space is separate from said general space, said sealed chamber containing in said enclosed space a quantity of a substance maintained in liquid-vapor equilibrium in the range of desired beverage temperatures, said sealed chamber being expansible and contractible by the response of said substance to said temperature in said general space whereby changes in said general space temperature results in changes in the pressure exerted by said substance, and said pressure responsive means and said temperature responsive means being operatively associated with said valve means to maintain desired beverage characteristics substantially constant within said range of desired beverage temperatures.

15. Apparatus for pressurizing beverage contained in a keg, comprising in combination a pressure reservoir; means connecting the reservoir with the space within the keg; a valve interposed in said connecting means; means, disposed interiorly of the keg and normally responsive to the pressure in said space, for controlling the valve; and means for modifying the action of said controlling means in accordance with the temperature in said space, comprising a sealed chamber containing a quantity of a substance in liquid-vapor equilibrium in the range of desired beverage temperature, said quantity of said substance sufficiently limited so that it is wholly in the vapor state at temperatures substantially above said range, said chamber being expansible and contractible in response to the pressure exerted by its contents, being disposed interiorly of the keg, and being operatively associated with said controlling means.

16. Apparatus for pressurizing beverage contained in a keg, comprising in combination a pressure reservoir; means connecting the reservoir with the space within the keg; a valve interposed in said connecting means; means, disposed interiorly of the keg and normally responsive to the pressure of said space for controlling the valve; and means for modifying the action of said controlling means in accordance with the temperature in said space, comprising a sealed chamber containing a quantity of a substance in liquid-vapor equilibrium in the range of desired beverage temperatures, said chamber further containing a gas at a small partial pressure, said chamber being expansible and contractible in response to the pressure exerted by its contents, being disposed interiorly of the keg, and being operatively associated with said controlling means.

References Cited in the file of this patent

UNITED STATES PATENTS

| 445,257 | Beck | Jan. 27, 1891 |
|---|---|---|
| 1,959,815 | Corcoran | May 22, 1934 |
| 2,471,328 | Jones | May 24, 1949 |
| 2,501,611 | Nicholson | Mar. 21, 1950 |
| 2,659,629 | Graham | Nov. 17, 1953 |
| 2,812,109 | Wentz | Nov. 5, 1957 |
| 2,812,783 | Bufogle | Nov. 12, 1957 |